(12) United States Patent  
Fenkanyn

(10) Patent No.: US 8,269,610 B2  
(45) Date of Patent: Sep. 18, 2012

(54) METHOD FOR MEASURING PRESSURE IN A TIRE

(75) Inventor: John Michael Fenkanyn, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 515 days.

(21) Appl. No.: 12/604,426

(22) Filed: Oct. 23, 2009

(65) Prior Publication Data

US 2011/0095870 A1  Apr. 28, 2011

(51) Int. Cl.
*H04Q 5/22* (2006.01)
(52) U.S. Cl. .................................................. 340/10.3
(58) Field of Classification Search ............... 340/10.5, 340/12.36, 12.5, 5.6, 505
See application file for complete search history.

(56) References Cited

U.S. PATENT DOCUMENTS 5,109,213 A * 4/1992 Williams .................... 340/447

* cited by examiner

*Primary Examiner* — Vernal Brown
(74) *Attorney, Agent, or Firm* — Richard B. O'Panick

(57) ABSTRACT

A method for sensing pressure in a pressurized article utilizing an electronic tag includes: calculating the impedance of a tag antenna, the tag antenna being flexible and at least partially composed of a flexible conductive pressure sensitive material including rubber; measuring changes in antenna impedance resulting from changes in pressure exerted on the tag antenna; calculating changes in tag transmission signal strength resulting from changes in antenna impedance; at least partially embedding the electronic tag within a wall portion of the article, the wall portion at least partially defining an article cavity and exerting a compressive force on the tag antenna of a magnitude determined by the magnitude of air pressure within the cavity; measuring the tag transmission signal strength with the tag antenna subjected to pressure from the article wall portion; determining the magnitude of air pressure within the cavity required to effect a compressive force on the tag antenna by the article wall sufficient to result in the measured tag transmission signal strength.

7 Claims, 4 Drawing Sheets

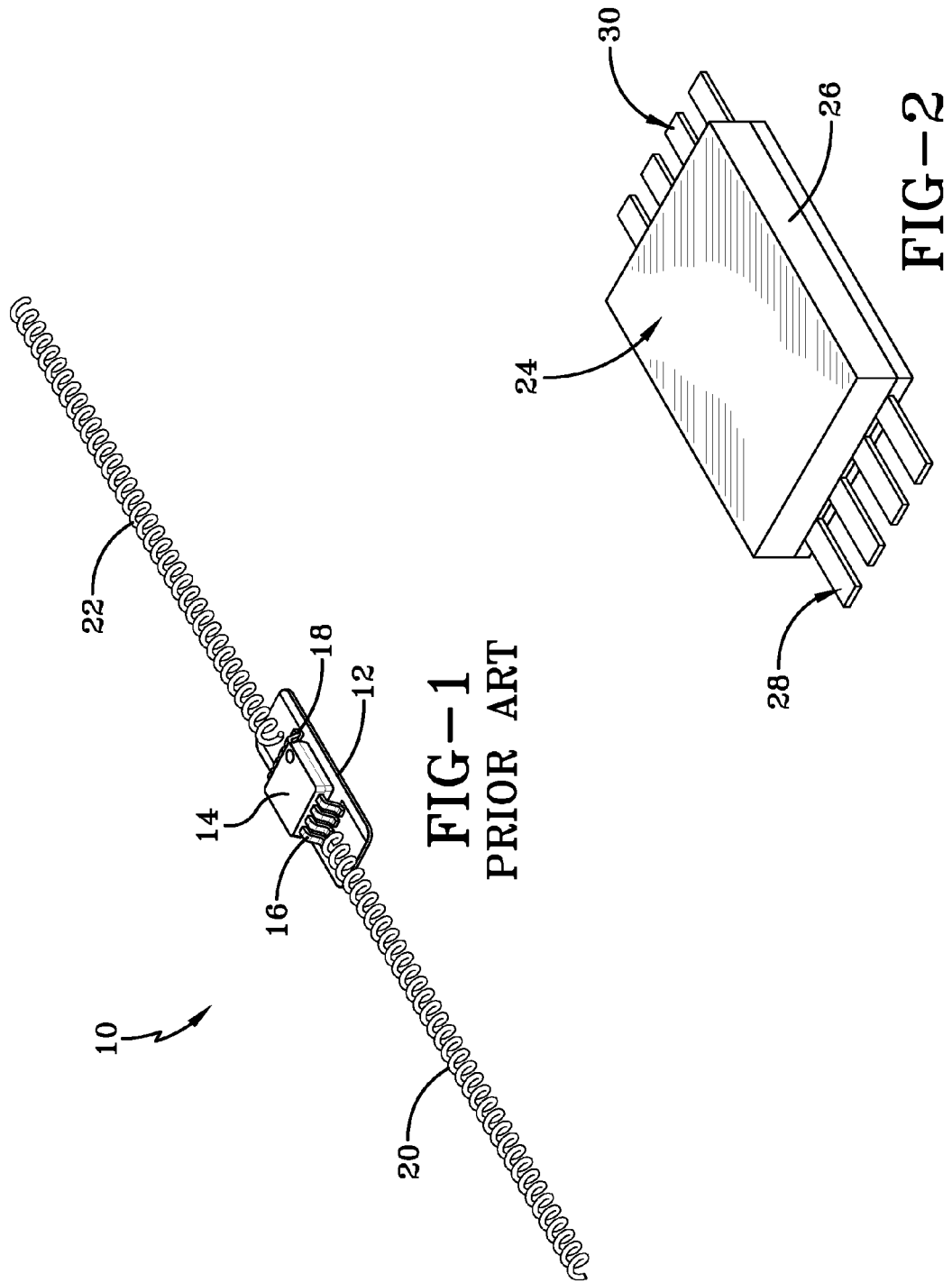

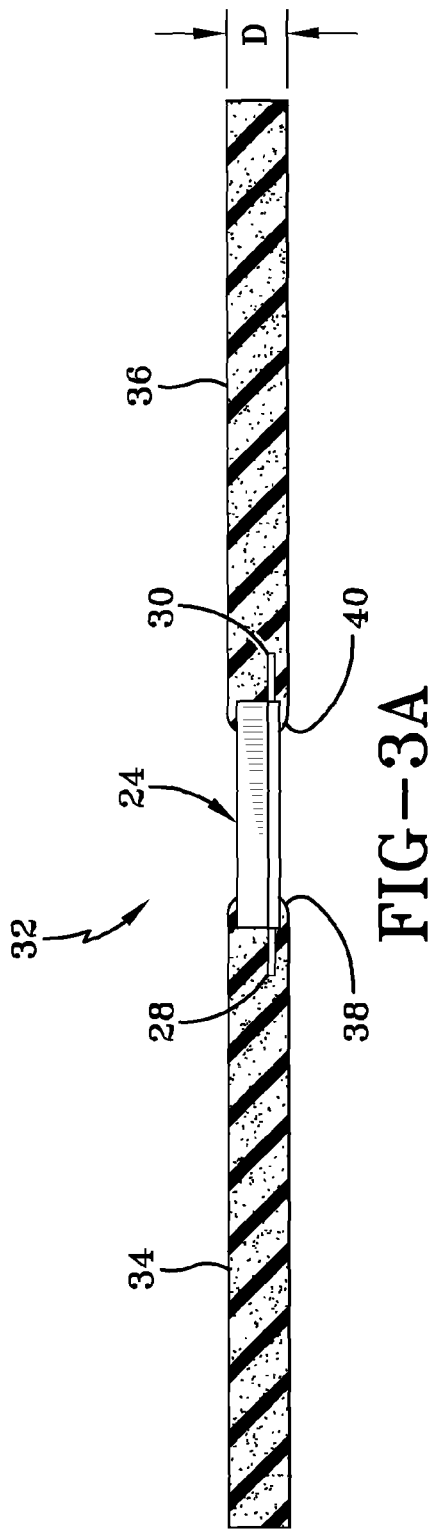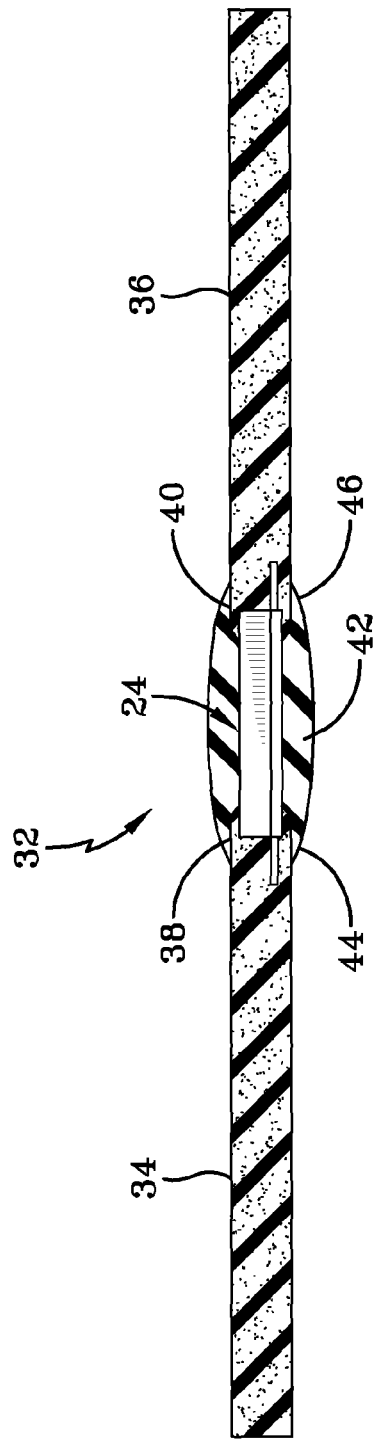

METHOD FOR MEASURING PRESSURE IN A TIRE

FIELD OF THE INVENTION

The invention relates generally to RFID electronic tags incorporated into a finished product such as a tire and, more specifically, to a method for utilizing such tags as pressure sensors.

BACKGROUND OF THE INVENTION

RFID electronic tags are incorporated into a variety of finished articles or products such as tires. Such tags include an electronic device for storing data such as a product identification number. The data stored within tag memory is transmitted upon receipt of an interrogation signal from the tag to a remote reader during the product life cycle to provide useful information concerning the product. Tags may further incorporate pressure sensing devices that are exposed to air pressure within the tire cavity. Measured pressure data may be transmitted from the tags to a remote reader upon demand.

SUMMARY OF THE INVENTION

In an aspect of the invention, a method for sensing pressure in a pressurized article utilizes an electronic tag and includes: calculating the impedance of a tag antenna, the tag antenna being flexible and at least partially composed of a flexible conductive pressure sensitive material including rubber; measuring changes in antenna impedance resulting from changes in pressure exerted on the tag antenna; calculating changes in tag transmission signal strength resulting from changes in antenna impedance; at least partially embedding the electronic tag within a wall portion of the article, the wall portion at least partially defining an article cavity and exerting a compressive force on the tag antenna of a magnitude determined by the magnitude of air pressure within the cavity; measuring the tag transmission signal strength with the tag antenna subjected to pressure from the article wall portion; determining the magnitude of air pressure within the cavity required to effect a compressive force on the tag antenna by the article wall sufficient to result in the measured tag transmission signal strength.

In another aspect, the method includes connecting a first and a second antenna arm comprising the antenna to opposite sides of the electronic device to form a bi-pole antenna configuration and separating inward ends of the first antenna arm from the second antenna arm by a separator component composed at least partially of non-conductive flexible rubber.

According to a further aspect, the method includes embedding the entirety of the tag within the article wall with the electronic device encased by the separator component and aligning the separator component m electronic device, and the first and the second antenna arms in a co-linear alignment within the article wall.

BRIEF DESCRIPTION OF THE DRAWINGS

The invention will be described by way of example and with reference to the accompanying drawings in which:
FIG. 1 is a perspective view of a RFID tag representative of the prior art;
FIG. 2 is a perspective view of a RFID tag electronic device pursuant to the invention;

FIG. 3A is a longitudinal sectional view of an RFID tag embodied pursuant to the invention with the intermediary non-conductive separator component removed for the purpose of illustration;
FIG. 3B is a longitudinal sectional view of the RFID tag with the separator component in place.

DETAILED DESCRIPTION OF THE INVENTION

Figure 4:
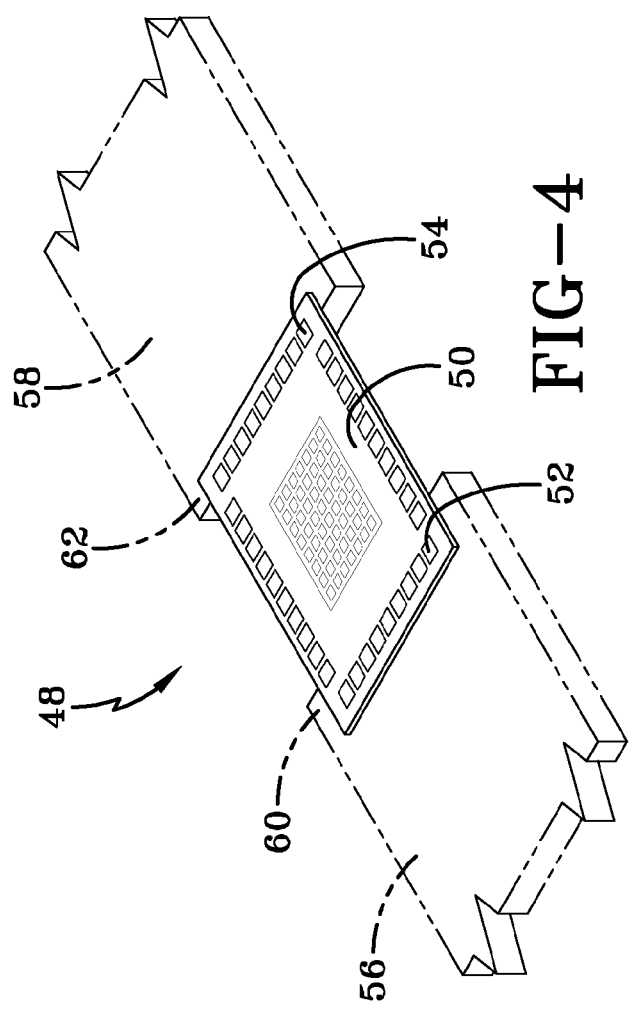
FIG. 4 is a perspective view of an alternatively configured electronic device in which the integrated circuit chip and contact array comprising the electronic device is not encased within a casing.

Referring first to FIG. 1, a conventional RFID tag 10 is shown to include a substrate 12 supporting an IC (integrated circuit) package 13 having edge contact arrays 16, 18. A pair of rigid metallic conductive coiled antenna arms 20, 22 are electrically coupled to respective contact arrays 16, 18 of the IC package 14. The IC package includes an IC chip (not shown) of conventional construction for performing data memory and data transmitting functions. The contacts 16, 18 are generally of serpentine configuration extending from the IC chip and bending downward to remote ends supported by the substrate 12. It is to those ends that the coil antenna arms 20, 22 are coupled by soldering or other known techniques.

The dipole antenna constituted by the coils 20,22 communicate data from the IC package 14 to an external reader. The tag 10 may be incorporated into sundry articles or products by embedding the tag 10 within the article or affixing the tag to the article by adhesive or other known techniques. Coupling the tag 10 with an article or product allows information such as product identification data stored within the IC package to be accessed throughout the life cycle of the product.

In some end use applications, the product is subjected to rigorous stresses and strains during normal use. Such forces may cause the antenna arms 20, 22 to separate from the CI contacts 16, 18 and cause a malfunction. Moreover, the material composition of the metallic coil antenna arms 20, 22, the substrate 12, and the IC package 14 may be dissimilar to the material composition of the host article into which the tag is incorporated. In such an event, the tag is considered "non-transparent" and bonding the tag to a portion of the article or product may become problematic. Failure of the bond may cause the entire tag to become separated from the article or product during use.

FIG. 2 shows one IC package 24 configured pursuant to the invention. The package includes an outer casing 26 enclosing an IC chip (not shown) from which arrays of contact arms 28, 30 extend in coplanar linear form. The arrays of contacts 28, 30 extend through opposite sides of the casing 26 as shown. Each of the contact arms 28, 30 are elongate and are preferably, although not necessarily, of a straight, non-serpentine configuration, unlike the contacts 16, 18 of the device 14 shown in FIG. 1. As used herein, "electronic device" is used interchangeably with "IC package" and refers to the IC circuitry and contacts used in the performance of tag functions such as identification data storage and transmission. The electronic device may include an outer casing 26 as shown in FIG. 2 or may be configured without a casing as shown in FIG. 4 as will be explained.

With reference to FIG. 3A, the subject tag 32 is shown. IC package or device 24 is positioned in line with a pair of antenna arms 34, 36. The antenna arms 34. 36 are composed of a conductive rubber compound or matrix from commercially available solid or liquid conductive rubber products such as, but not limited to, Zoflex (manufactured and sold by XILOR, Inc., and located in Knoxville, Tenn. The antenna arms 34, 36 are connected to the RFID electronics at respective arrays of contacts. 28, 30. Connection is established by encasing the contacts 28, 30 within inward ends 38, 40 of the arms 34, 36, respectively. The arms 34, 36 are of flexible conductive rubber construction having a thickness or width D at inward ends 38, 40 sufficient to encase the contacts 28, 30 and to overlap respective opposite ends of the electronic device or IC package 24. That is, the depth, width D, is wider than the IC package 24 whereby allowing the antenna arm inward ends 38, 40 to extend over opposite sides and edges of the IC package 24 as seen from FIG. 3A.

FIG. 3B shows the placement of a separator component 42 about the IC package 24. The component 42 encases the IC package 24 and is composed of non-conductive material such as a non-conductive rubber. The component 42 thus electrically separates the antenna arms 34, 36 and further serves to protect the IC package 24. Preferably, although not necessarily, ends 44, 46 of the separator component 42 will overlap the ends 38, 40 of the arms 34, 36, thus creating a complete rubber-based casing of the entire tag assembly. That is, the entire tag 32 is sheathed in a rubber base that will be transparent when embedded into an article or product such as a tire that is composed primarily of rubber. The RFID tag 32 thereby lends itself to a low cost method of production such as an extrusion process in which the conductive arm 34, IC device 24, non-conductive separator component 42, and conductive arm 36 are sequentially extruded into a finished tag. The resultant tag will be flexible and bond better and more easily into a rubber product such as a tire. Moreover, because the components are of rubber materials, the tag is more non-obtrusive within a tire portion such as a wall, making the bonding of the tag to the tire stronger and less prone to failure. The risk of tag separation from the tire is thereby minimized.

Figure 5:
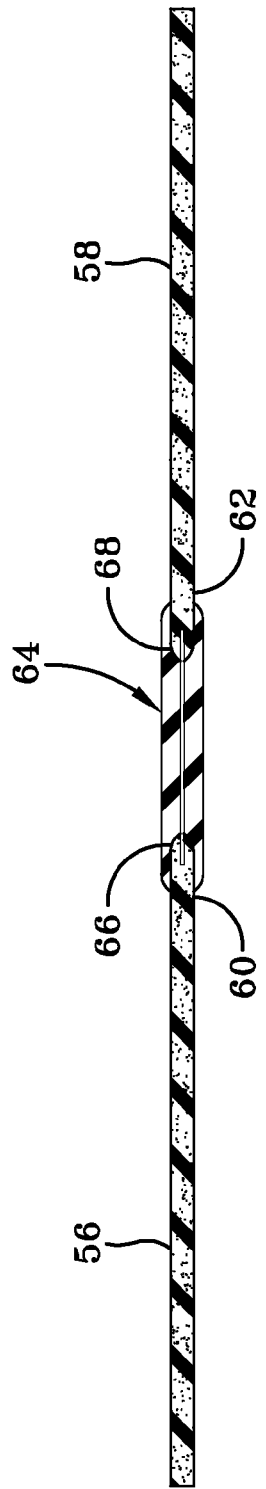
FIG. 5 is a longitudinal sectional view of the alternative tag configuration showing encasement of inward ends of the antenna arms by a separator component.

FIGS. 3A and 3B show a tag embodiment in which the electronics is encased. FIGS. 4 and 5 show an alternative tag embodiment 48 that eliminates the encasement package of the electronics and affixes flexible conductive rubber-based antenna arms 56, 58 directly to edge contacts 52, 54 of an integrated circuit 50. The IC 50 has arrays of contacts 52, 54 along opposite edges. The antenna arms 56, 58 composed as described above from flexible conductive rubber. Inward ends 60, 62 of the arms 56, 58 affix over the edges of the IC and thereby establish electrical contact. The diameter or thickness of the arms 56, 58 is greater than the thickness of the IC 50. A separator 64, as shown by FIG. 5, encases the IC 50 and is dimensioned to overlap the inward ends 60, 62 of the arms 56, 58. The separator component 64 is formed of non-conductive material such as rubber. The resulting tag shown in FIG. 5 is thus completely encased by a material (rubber) compatible with and transparent to the material of a host rubber article such as a tire. The IC 50 is further protected by the flexible external sheath created by the arms 56, 58 and the separator component 64.

The tag 48 can be inserted in its entirety within a wall of an article or product such as a tire sidewall. The RFID tag becomes transparent when embedded into the tires because tires are likewise composed primarily of rubber having generally the same mechanical and material properties as the tag antenna arms 56, 58. As a result, performance of the tire is not degraded by the presence of the tag 48 and a bonding of the tag within a tire sidewall is less likely to fail over time from tire use. Compatibility is used herein to mean materials having like mechanical and material properties. Compatibility between the tag 48 composition and that of the host tire product portion into which the tag is embedded thus creates a desired transparency between the tag and the tire.

The tag 48 may be completely embedded within a wall of the tire; partially embedded; or externally affixed by adhesive or other means. When completely embedded, the flexibility of the tag will complement the flexibility the surrounding tire wall (i.e. become transparent). If partially embedded, a portion of the tag 48 will remain exposed. If affixed by adhesive, the tag 48 will be exposed to the ambient air cavity. It is commonplace to internally mount an RFID to either a tire sidewall defining the tire cavity or to an underside of the tire tread tire portion defining the cavity. So positioned, the tag 48 is proximate to the tire cavity that becomes pressurized when the tire is mounted to a wheel.

It is contemplated that the tag, whether in the configuration 32 or 48, when mounted to tire, will function to transmit product identification data, when subjected to an interrogation signal, to a remote reader by means of the dipole antenna arms 34, 36 (FIGS. 3A, 3B) or 56, 68 (FIGS. 4, 5). The use of the RFID tag may be extended if desired for deployment as a low cost, durable and passive (requiring no internal power source) pressure sensor for detecting air pressure within an adjacent pressurized ambient air mass. In a tire, the tag can serve as a pressure sensor for measuring the air pressure within a tire cavity. For use as a pressure sensor in a tire, the tag antenna arms are composed of a flexible, electrically conductive, and pressure sensitive material such as conductive polymers or a pressure sensitive polymer. Such a material is commercially available from XILOR, Inc. The signal strength returned from the RFID tag when it is interrogated will vary based on the surrounding pressure brought to bear on the tag antenna arms because the impedance of the rubber changes with pressure.

If the RFID tag and its antenna arms are completely embedded within a rubber composed wall of an article or product, the RFID tag by varying signal strength will indicated changes of pressure within that wall bearing upon the tag. In the case of measuring tire cavity air pressure, the tag may be embedded within a wall of the tire defining the tire cavity. Changes in air pressure within the cavity will change compression forces within the tire walls defining the tire and will thereby vary the compressive forces bearing on the antenna arms. The change in compression forces on the tag antenna arms will be reflected in a variance in signal strength, whereby serving to communicate tire cavity air pressure.

The RFID tag may also be partially embedded within the tire wall such that a portion or the entirety of the antenna arms remain exposed to the ambient air mass within the tire cavity. In this system, changes in tire cavity air pressure will directly impact against the tag antenna arms and change impedance of the rubber therein. The change in signal strength can be detected by an external reader and calculations made to determine the air pressure within the cavity that correlates with the impedance values within the antenna arm rubber. Likewise, the tag may be mounted against the tire sidewall by adhesive agents or the like, and a similar procedure used to measure the signal variation resulting from pressure changes against the tag antenna arms.

Figure 6:
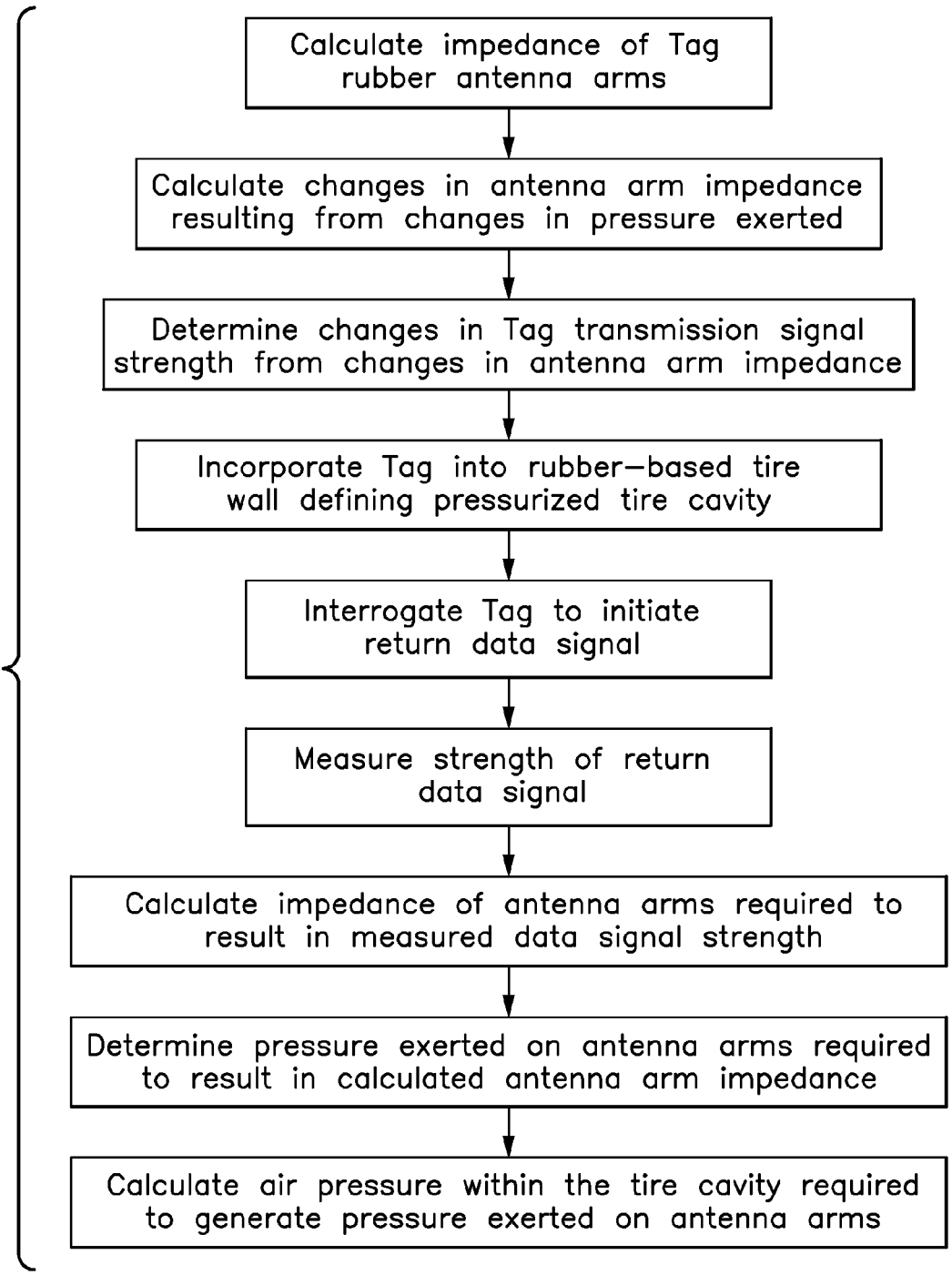
FIG. 6 is a block level diagram of the procedure for configuring and utilizing the tag as a pressure sendor device.

In the aforementioned pressure sensor applications, as seen from the block diagram of FIG. 6, it is necessary to first study and calculate the conductive rubber within the antenna arms and how the impedance will vary according to pressure on the arms. Once such a study and calculations are completed, pressure sensor application of the tag within a product and article can be made. An interrogation of the tag from an external signal will result in data transmission from the tag to a reader. The transmission signal can then be analyzed and, from its strength, the impedance of the antenna arms deduced. From the impedance value thus calculated, the pressure against the antenna arms may be determined and a conclusion of air pressure within the tire cavity necessary to produce such a pressure on the arms can be calculated.

With specific reference to FIG. 6, the procedure for implementing a pressure sensor tag application is as follows: calculating the impedance of a tag antenna, the tag antenna being flexible and at least partially composed of a flexible conductive pressure sensitive material including rubber; measuring changes in antenna impedance resulting from changes in pressure exerted on the tag antenna; calculating changes in tag transmission signal strength resulting from changes in antenna impedance; at least partially embedding the electronic tag within a wall portion of the article, the wall portion at least partially defining an article cavity and exerting a compressive force on the tag antenna of a magnitude determined by the magnitude of air pressure within the cavity; measuring the tag transmission signal strength with the tag antenna subjected to pressure from the article wall portion; determining the magnitude of air pressure within the cavity required to effect a compressive force on the tag antenna by the article wall sufficient to result in the measured tag transmission signal strength.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for sensing pressure in a pressurized article utilizing an electronic tag, the tag being of a type having an electronic device storing article-specific data and an antenna coupled to the electronic device for transmitting a tag transmission signal to a remote reader device, the method comprising:

calculating the impedance of the tag antenna, the tag antenna being flexible and at least partially composed of a flexible conductive pressure sensitive material including rubber;

measuring changes in antenna impedance resulting from changes in pressure exerted on the tag antenna;

calculating changes in tag transmission signal strength resulting from changes in antenna impedance;

at least partially embedding the electronic tag within a wall portion of the article, the wall portion at least partially defining an article cavity and exerting a compressive force on the tag antenna of a magnitude determined by the magnitude of air pressure within the cavity;

measuring the tag transmission signal strength with the tag antenna subjected to pressure from the article wall portion;

determining the magnitude of air pressure within the cavity required to effect a compressive force on the tag antenna by the article wall sufficient to result in the measured tag transmission signal strength.

2. The method of claim 1, wherein further comprising connecting a first and a second antenna arm comprising the antenna to opposite sides of the electronic device to form a bi-pole antenna configuration.

3. The method of claim 2, wherein further comprising separating inward ends of the first antenna arm from the second antenna arm by a separator component composed at least partially of non-conductive flexible rubber.

4. The method of claim 3, wherein further comprising substantially embedding the entirety of the tag within the article wall.

5. The method of claim 4, wherein further comprising encasing the electronic device by the separator component.

6. The method of claim 5, wherein further comprising overlapping the inward ends of the first and the second antenna arms by the separator component.

7. The method of claim 6, wherein further comprising aligning the separator component m electronic device, and the first and the second antenna arms in a co-linear alignment within the article wall.

\* \* \* \* \*